United States Patent
Forstmann et al.

(10) Patent No.: US 10,620,970 B2
(45) Date of Patent: Apr. 14, 2020

(54) REQUEST PROCESSING BY A RUNTIME AGENT IN A NETWORK SYSTEM

(71) Applicant: SAP SE, Walldorf (DE)

(72) Inventors: Gerd Forstmann, Waghausel (DE); Lars Erbe, Waghausel (DE); Otto Makris, Waghausel (DE); Rachel Ebner, Waghausel (DE)

(73) Assignee: SAP SE, Walldorf (DE)

( * ) Notice: Subject to any disclaimer, the term of this patent is extended or adjusted under 35 U.S.C. 154(b) by 316 days.

(21) Appl. No.: 15/384,257

(22) Filed: Dec. 19, 2016

(65) Prior Publication Data
US 2018/0173806 A1    Jun. 21, 2018

(51) Int. Cl.
| | |
|---|---|
| *G06F 9/00* | (2006.01) |
| *G06F 9/448* | (2018.01) |
| *G06F 8/60* | (2018.01) |
| *G06F 8/71* | (2018.01) |
| *G06F 8/65* | (2018.01) |

(52) U.S. Cl.
CPC ............ *G06F 9/448* (2018.02); *G06F 8/60* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,006,242 A | * | 12/1999 | Poole | G06F 17/278 715/209 |
| 7,668,093 B1 | * | 2/2010 | Clubb | G06F 9/542 370/231 |
| 2004/0030741 A1 | * | 2/2004 | Wolton | G06F 16/954 709/202 |
| 2007/0156670 A1 | * | 7/2007 | Lim | |
| 2007/0156694 A1 | * | 7/2007 | Lim | |
| 2007/0156695 A1 | * | 7/2007 | Lim | G06F 21/6218 |
| 2010/0235581 A1 | * | 9/2010 | Anderson | G06F 12/0813 711/130 |
| 2013/0326208 A1 | * | 12/2013 | Jacobsen | G06F 9/448 713/100 |
| 2016/0291940 A1 | * | 10/2016 | Searle | H04L 63/10 |
| 2016/0291959 A1 | * | 10/2016 | Searle | H04L 41/082 |
| 2016/0294605 A1 | * | 10/2016 | Searle | H04L 41/082 |
| 2016/0294614 A1 | * | 10/2016 | Searle | G06F 8/654 |
| 2016/0321086 A1 | * | 11/2016 | Suzuki | G06F 21/629 |
| 2018/0262388 A1 | * | 9/2018 | Johnson | G06F 9/448 |

* cited by examiner

*Primary Examiner* — Farhan M Syed
(74) *Attorney, Agent, or Firm* — Fish & Richardson P.C.

(57) ABSTRACT

Various embodiment of systems and methods to send a response for a request received at a runtime agent has been described. Initially a request including an access path of plurality of files is received at the runtime agent. Based on the received request, one or more files from the plurality of files that have a dynamic property are determined. Next the one or more files that have the dynamic property are parsed to identify an include statement in the one or more files, wherein the include statement has an access path for a to-be-included file. Next the data from the one or more files and the to-be-included file is retrieved by the runtime agent. The data retrieved from the one or more files and the to-be-included files to obtain a merged data are merged. Finally the response including the merged data is sent to the client by the runtime agent.

14 Claims, 11 Drawing Sheets

```
<SCRIPT>
VAR CONFIG = {
  USERNAME : "{{INCLUDE "../USER/ENV/USERNAME.USR" ENCODING="JSONSTRING"}}",
  REQUESTLANGUAGE : "{{INCLUDE "../REQUEST/ENV/SAP-LANGUAGE.REQLANGU"}}",
  REQUESTLANGUAGEBCP47 : "{{INCLUDE "../REQUEST/ENV/LOCALEBCP47.REQLANGU"}}",
  REQUESTLANGUAGEBCP47UNDERSCORE : "{{INCLUDE "../REQUEST/ENV/LOCALEUNDERSCORE.REQLANGU"}}",
  SEED : "{{INCLUDE "../REQUEST/ENV/SEED.REQSEED"}}",
  PERSTOKEN : "{{INCLUDE "../USER/PERS/FLP/_RAG-TOKEN.TXT"}}"
}; ← 402
VAR SITEURL ="/USER/FLPSITE/~{{INCLUDE "../USER/FLPSITE/_RAG-TOKEN.TXT"}}~/FLPRTMD_{{INCLUDE "../REQUEST/ENV/
LOCALEUNDERSCORE.REQLANGU"}}.JSON";
                                        404                                        406
</SCRIPT>
```

FIG. 4

```
<SCRIPT>

VAR CONFIG = {
    USERNAME : "TESTUSER",
    SAPLANGUAGE : "EN",
    SAPLANGUAGEBCP47 : "EN-US",
    SAPLANGUAGEBCP47UNDERSCORE : "EN_US",
    SEED : "EB1216AEABAB4029888F6B07C8917EFC",
    PERSTOKEN : "20160623081059000"
};
VAR SITEURL = "/USER/FLPSITE/~20160623~/FLPRTMD_EN_US.JSON";

</SCRIPT>
```

FIG. 5

REQUEST PROCESSING BY A RUNTIME AGENT IN A NETWORK SYSTEM

BACKGROUND

The use of cloud computing as a service provider has grown exponentially in the past decade. In a cloud computing setup, a resource for example a data may be present at a centralized cloud. The cloud can then distribute this resource or data to any number of systems or users. One of the issues with hosting data in the cloud is that whenever any data update or software update is to be performed for data stored in the cloud then it leads to delay in processing of any request received from the systems. Another issue with hosting data in the cloud is that different versions of the data needs to be stored in the cloud depending on the different personalization desired by the systems.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 4 is an exemplary block diagram illustrating a portion of result file 400 including access paths for a plurality of placeholder files, according to an embodiment.

FIG. 5 is an exemplary block diagram illustrating a result obtained corresponding to the result file of FIG. 4, according to an embodiment

DETAILED DESCRIPTION

Embodiments of system and method for displaying visualization image on portable electronic device are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
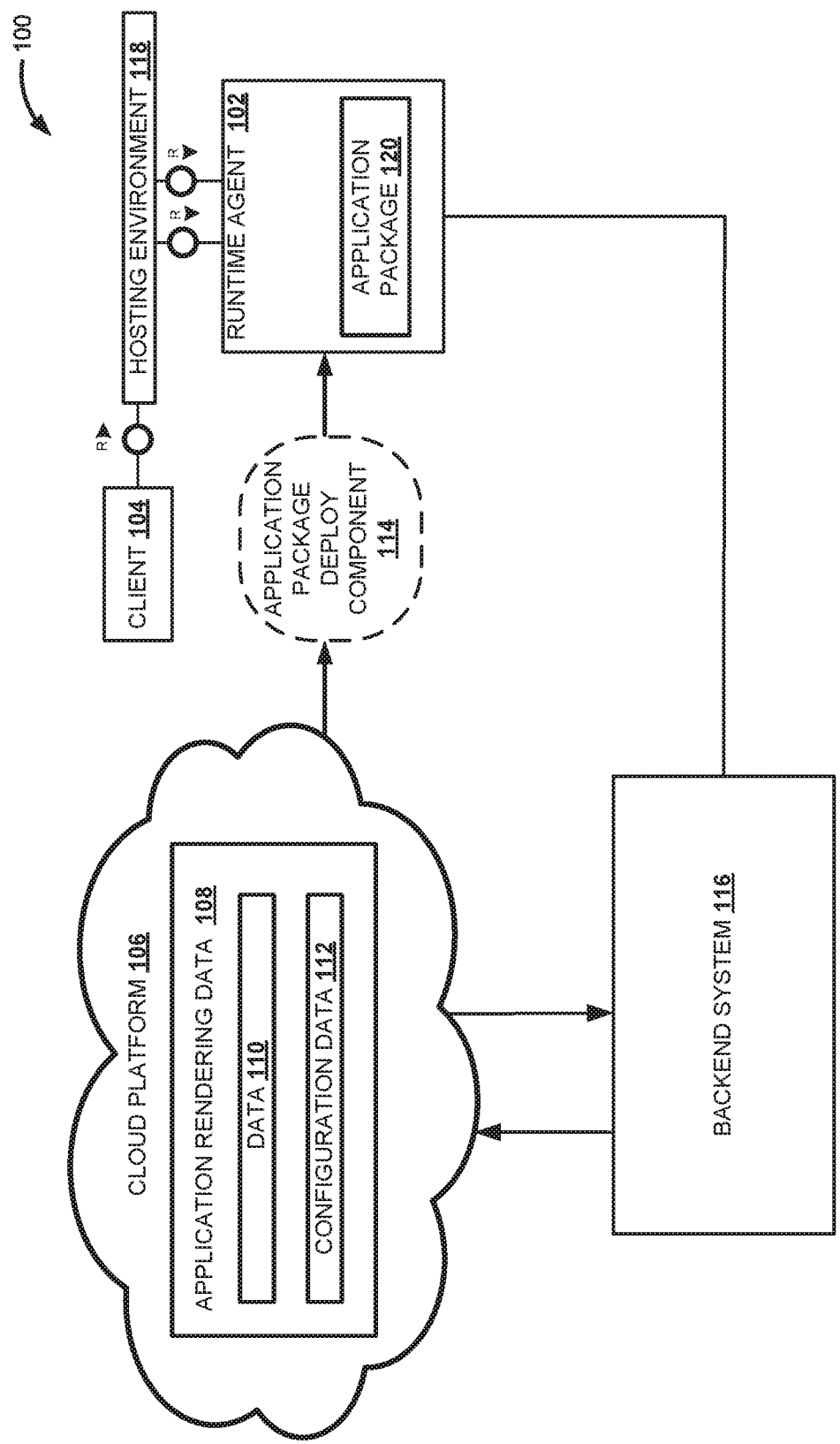
FIG. 1 is a block diagram illustrating a system including a runtime agent that provides response for a request received at a client, according to an embodiment.

FIG. 1 is a block diagram illustrating a system 100 including a runtime agent 102 that provides response for a request received at a client 104, according to an embodiment. In one embodiment, the request is received to retrieve data related to an application from a runtime agent 102. Application (App) is a computer program that performs a group of coordinated functions, tasks, or activities. The app may be, for example, SAP Fiori® app provided by SAP SE®. In one embodiment, the client is a computing device that communicates with other devices or server over the internet. The client may also include a portable electronic device, for example, a smartphone, a smart watch, etc.

In one embodiment, the system 100 includes a cloud platform 106, for example, SAP Hana® Cloud platform that stores an application rendering data 108. Cloud platform is a Platform-as-a-Service (PaaS) that allows customers to develop, run, and manage applications. The application rendering data 108 includes data 110 and configuration data 112. Data 110 included application artifacts, for example user interface (UI5) source code library for rendering the applications at the user interface of a client device, and application content, for example, filter settings and table layout variants for the application. The configuration data 112 may include different properties related to the applications, for example, access control, hierarchical relationship, etc., between the different applications. In one embodiment, the configuration data 112 may also include a user specific data, for example, an application personalization data that defines personalization of an application for a particular user.

In one embodiment, the application rendering data 108 may include design time artifacts. A design time artifact comprises source (e.g., design time) objects and can include source code, procedures, functions, data structures, types, descriptions of database tables, descriptions of views, descriptions of indexes, etc. The design time artifacts may be grouped together into related files (e.g., source code files or other files with source objects). For example, the data 110 may be grouped based on the access right of the users that may access the applications. In this case, leave approval application, employee appraisal application may be grouped together as these applications may be accessed only by a user having a "Manger" role.

The system 100 includes an application package deploy component 114 that is triggered to retrieves application rendering data 108 from the cloud platform 106 and generate an application package 120 corresponding to the application rendering data 108. The application package 120 includes runtime artifacts corresponding to the design time artifacts in the application rendering data 108. A runtime artifact includes files and folders that may be accessed during runtime. In one embodiment, the application package deploy component 114 analyzes the hierarchy and relationship between the applications, for example, grouping of the applications, from the applications data and then converts the applications data into files included in different folders of the application package 120. The folders may be arranged in an order to indicate the hierarchical relationship between different data. For example, the cloud platform may group application files that may be "shared" with all users in one group and application files that may be "shared" only with users that have a "manager" role in another group. In this case a parent folder "shared" may be defined that includes files representing the different applications that are grouped as "shared", and a child folder "shared/manager role" corresponding to the parent folder "shared" may be defined that includes files that are grouped as "shared" only with users having a "manager" role. In one embodiment, the application package deploy component 114 analyzes the data 110 and the configuration data 112 to determine the grouping of the different applications in the application package 120.

The application package deploy component 114 also define access paths for accessing the folders and files included in the application package 120. The access path represents the hierarchical structure of the data 110 defined in the cloud platform 106. For example, a parent folder may be a "shared" folder, a child folder for the shared folder may be "roles" and a grand-child folder may include "Manager Role". In this case, the access path for the shared folder is "/shared/" that may include a list of all shared files, the access path for the child folder may be "/shared/roles" that may include a list of different roles, for example, a manager role and an employee role, and the "/shared/roles/Manager role" may include a list of application files that are accessible to a person with a manager role.

In one embodiment, the access path also defines a processing logic for processing two or more files to obtain a resultant file based on the relationship between applications data defined in the cloud platform 106. For example, the relationship between an application file and an application catalog may be that the application catalog file and the application file are to be merged when a request is received to access the application file. In this case, an "include" statement may be used to insert the access path of the application catalog file in the application file that indicates that the application catalog data is to be merged with the data whenever a response is to be provided to a request for data.

The application package deploy component 114 then deploys the application package including the different folders and files to a runtime agent 102. In one embodiment, the runtime agent executes on an application server. An application server is a software framework that provides facilities to create web applications and a server environment to execute the web applications. The runtime agent 102 is a software or hardware component that has a memory to store application package and a processor to process data stored in the runtime agent or retrieved from external sources and provide a result for a request based on the processing. In one embodiment, the runtime agent 102 provides access to the application data stored in the application package to the client 104 without communicating with the cloud platform 106. In one embodiment, the runtime agent includes resource handler APIs that acts as access point for the runtime agent. The resource handler APIs allow a client 104 to access the different folders and files based on an access request received from a client 104. The runtime agent 102 is also defined to retrieve data from a backend system 116 to provide response for a request received from client 104.

The runtime agent 102 provide several features without any code enhancement or software updates at the runtime agent. For example, an application file may be defined to merge data of another application file along with the data of the application file whenever a request to retrieve data from the application file is received. In this case, the application file may have an "include" statement that has the access path of the other application file that is to be merged with the application file. The runtime agent 102 may identify the "include" statement in the application file and then retrieve and merge the data of the two files. The merged data may then be provided as a response to the request.

In one embodiment, the runtime agent may also be defined to retrieve data from various data sources using placeholder files that do not have stored data. These placeholder files retrieve data during runtime based on a processing logic that is executed by the runtime agent. The retrieved data may be used for processing a request received from the client 104. For example, a placeholder file may be a "user role" placeholder file that has a processing logic to retrieve user role, of a user requesting data, from a hosting environment 118. The hosting environment, for example SAP Fiori® Launchpad, may be defined to host several applications at the client 104. The hosting environment 118 manages execution of the different applications by the client. The hosting environment 118 may also stores user role information related to a user that sends a request at client 104. This user role may then be used to determine the different files that the user may access based on the user's profile. For example, when the user profile is "office assistant" then the included in a folder for the "office assistant" may be presented to the user with the "office assistant" profile. Similarly the placeholder file may be "request language" in this case the "request language" placeholder file has a processing logic to retrieve request language parameter from the request.

In one embodiment, the runtime agent 102 also ensures high availability of the runtime agent when the data, included in the application package, stored in the runtime agent 102 is updated. The runtime agent 102 stores result obtained after processing a request in a cache memory for faster processing of future requests. During a subsequent request, the runtime agent 102 provides the result based on the stored cache instead of again re-processing the request. The cache result may be incorrect when one of the files in the folder is changed. In this case, the result for any pending request needs to be processed by retrieving data from the files instead of providing stored data in cache. This may lead to unavailability and reduced performance of the runtime agent. To address this issue, the runtime agent provides the result for any pending request based on the cache memory that stores the data before the change. The runtime agent 102 then asynchronously changes the data at an idle time, i.e., when there is no pending request for the file and then updates the cache memory with the updated data.

In one embodiment, the runtime agent 102 may be deployed on any application server as it is not defined for a particular application server. Further, as the runtime agent 102 does not require the cloud platform 106 or any other common resource for processing request, several independent instances of the runtime agent 102 may be executed in parallel on several different application servers, for example, an Advanced Business Application Programming (ABAP®) application server, SAP HANA® XS advanced application server, etc. These instances may also be modified independently without affecting the other instance.

Figure 2:
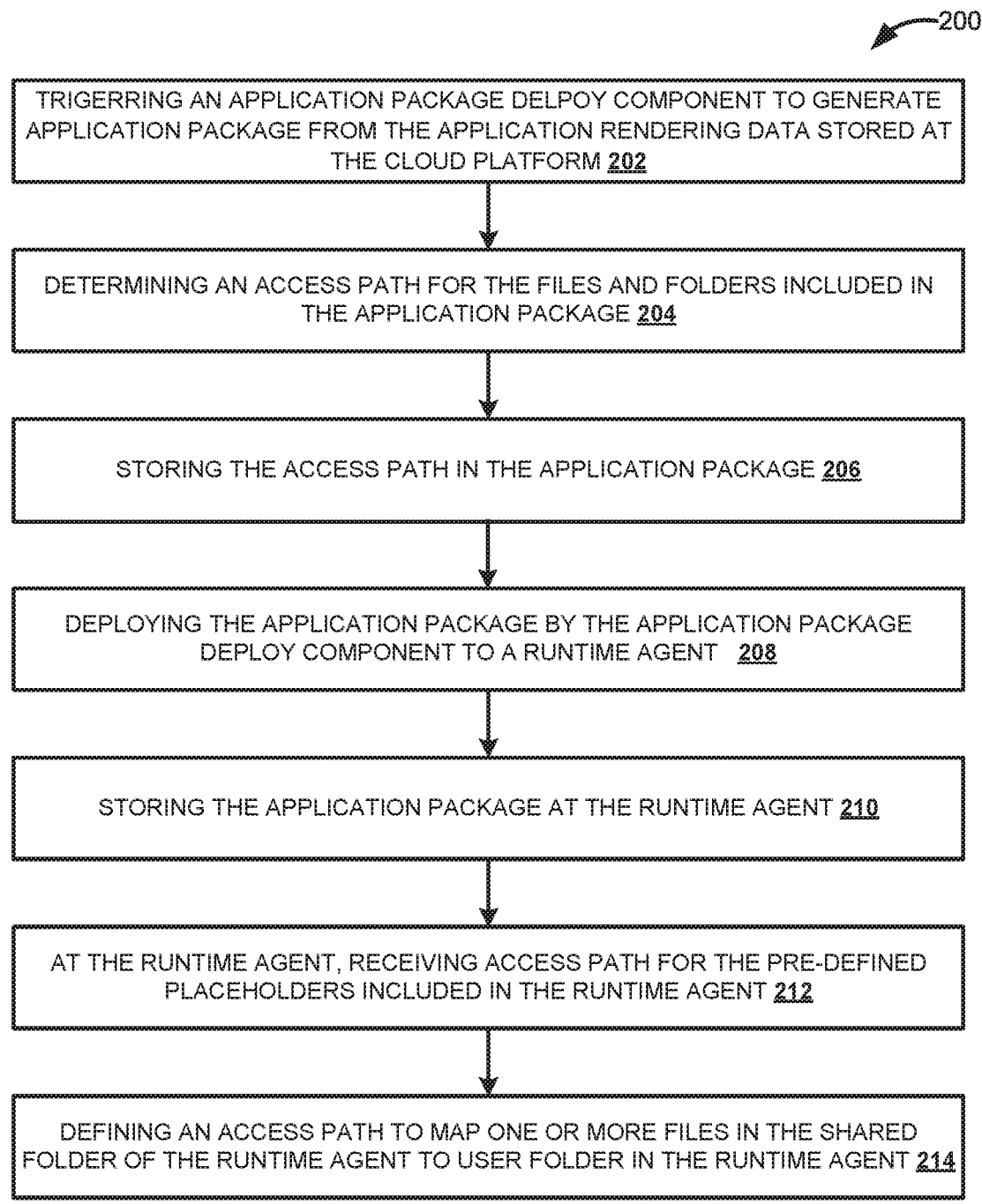
FIG. 2 is a flow diagram illustrating a process to store an application package at the runtime storage, according to an embodiment.

FIG. 2 is a flow diagram 200 illustrating a process to store an application package at the runtime storage, according to an embodiment. Initially an application package deployment component is triggered to generate application package from the application rendering data stored at a cloud platform (202). The package deployment component may be triggered by the runtime agent to initiate generation of packet. The application package deployment component may convert applications data at the cloud platform to application files in folders included in the application package. In one embodiment, the application package deployment component converts the applications data to JavaScript® Object Notation (JSON) file.

In one embodiment, the application package may include root folders that have pre-defined folder properties. The application files, obtained after converting the data, may be assigned to one of the root folders. The pre-defined folder properties may include a pre-defined folder "scope" property that defines the type of data that the folder may store. For example, the folder scope property may be "system", "shared", "user" and "config". When the folder scope property is "system" then the folder is defined to include application files related to system that is not accessible by user. When the folder scope property is "shared" then the folder is defined to include application files that may be accessed by all users. When the folder scope property is "user" then the folder is defined to include user specific application files. When the folder scope property is "config" then the folder is defined to include application configuration related files.

In one embodiment, the application rendering data includes configuration data that defines the properties of the applications data corresponding to different applications. For example, the configuration data may include a scope property that defines the scope of the applications data corresponding to different applications. Based on the scope the application file, obtained after converting a data, may be assigned to one of the folders in the application package that has the same scope. For example, a data that has scope "shared" may be converted to an application file that has a scope "shared" and then included in a folder that has the property "shared". Several sub-folders of the root folders may then be generated based on the hierarchical information related to the data obtained from the configuration data included in the application rendering data. For example, the shared data in the cloud platform may define that a data related to "manager role" and "employee role" are children for a data related to "role". In this case, a root folder "shared" may be provided that includes two entries a "manager role" folder and an "employee role" folder. Two sub-folders, of the folder "role", are then generated for "manager role" and "employee role", respectively. The "manager role" subfolder includes application files that are assigned to a user with "manager" role. Similarly the "employee role" subfolder includes application files that are assigned to an employee with "employee" role. The folder and the sub-folders model indicate that the "employee role" and the "manager role" are children for the "role" folder.

In one embodiment, the configuration data included in the application rendering data is also converted to a configuration file and included in a configuration folder of the application rendering packet. In one embodiment, a single configuration file includes configuration data for all the applications included in the cloud platform. The configuration data includes application properties, for example, access properties, dynamic properties, and cache properties. The access properties for a folder defines the "read", "right" and "visible" rights for a particular folder. The access rights may be defined for the different roles, for example, a user with a "manager" role may have both "read" and "right" access rights for a particular folder, and a user with an "employee" role may have only "visible" rights for the particular folder. In one embodiment, the access right may be provided as a Boolean expression, which may have a value "True" or "False". For example, the access right expressions for a "file" may include:
access: {
"read": (file: " . . . /user/env/roles.txt" "anyOf": ["ROLE_A", "ROLE_B"]}
"write": {file: " . . . /user/env/roles.txt" "anyOf": ["ROLE_B"]}
"visible": "true"
}

Based on this Boolean expression, a user may be provided a read access for the file when the user has either "Role A" or "Role B", a write access when the user has "Role B", and the file is visible to all users. Whenever a user request is received to access data from this particular folder then the user's role is dynamically retrieved by a placeholder "user profile" and then the retrieved user role is compared with the access right expressions for the file. When the user role matches with the role in the access right expressions for read, right, or visible access properties then the user is provided the corresponding access, for example, one or more of the read, write, or visible access, to the file.

The cache properties of the folder define whether the response related to a particular request is determined based on a result stored in a cache memory or based on the data stored in an application file of the application package. In one embodiment, the cache memory is a browser cache. The browser cache is a temporary storage location for files downloaded by the browser to display websites. Files that are cached locally include any documents that are part of a displayed webpage, for example, html files, CSS style sheets, JavaScript® scripts, as well as graphic images and other multimedia content. The cache memory stores the result obtained after retrieving and/or processing data retrieved from an application file based on a previously received request. In one embodiment, a "cache" property of a folder may be set as one of: "cached" property, "cache invalidate" property, "volatile" property, or "public" property. When the "cache" property of a folder is set as "cached" then the result for the folder is served based on the result stored in the cached storage. When the "cache" property of the folder is set as "cache invalidate" then the result for the folder is provided from the cache memory when the cache memory stores the latest data. In case the cache memory is not storing the latest data then the data in the cache storage is determined as "invalid" and the data stored in the application file is used to determine result of a received request. When the "cache" property is "volatile" then the request for folder is determined based on the data stored in application file and not based on the data stored in the cache memory. When the "cache" property is "public" then the cached data are to be stored in intermediate proxy server that resides between a client and the application server.

The configuration file may also include a "dynamic" property that indicates whether an application file is "dynamic" or "static". When the folder has a property set as "dynamic" then it indicates that the application file includes a processing logic that is executed to obtain the result for a request related to the application file. For example, a folder that is "dynamic" may have an "include" statement that defines a merging logic to merge the data of a to-be-included application file with the data of the application file. In this case, an "include" statement present in the application file may include an access path for a to-be-included application file the content of which are to be merged with the content of the application file. In one embodiment, the "include" statement may have access paths for several to-be-included application files and the data in these to-be-included application files are merged with the data of the application file to obtain result for a request. The "include" statement may also have a "merge" parameter that indicates the data format in which the data of the to-be-included application files are to be converted before merging with the data of the file. For example, an include statement included in the application file may be:

{{include " . . . /roles/[role 1.role 2]/catalogs.json" merge="jsonmap"}}

In this case, the include statement has two access paths, " . . . /roles/role 1/catalogs.json" and " . . . /roles/role 2/catalogs.json", which are access paths to two different to-be-included application files defined for "role 1" and "role 2". The data in these to-be-included application files are retrieved and then converted to a Java Script® Object Notation (JSON) string based on the format specified in the merge option. The data in the JSON format is then combined with the data, for example catalogs, included in the file. Different formats may be used for the access paths in the "include" statement. For example, the access path may have a wild card entry, for example [?1] that may be replaced with the access path of another to-be-included file. For example, the "include" statement with a wild card [?] may be:
({include " . . . / . . . /shared/roles/[?1]/catalog.json"?1= " . . . / . . . /user/env/roles.txt" merge="jsonmap"}}

The "include" statement may allow several merge formats, for example: "none", "xmlattribute", "encodeURL-Component", "jsonstring" and "base64", to modify the data of the to-be-included application file before merging with the data of the application file. When the merging format is "none" then the data of the to-be-included application file is inserted as plain text with the data in the application file. When the merging format is "xmlattribute" then the data of the to-be-included application file is encoded as an XML attribute and merged with the data of the application file. When the merging format is "encodeURL" then an URL encoding is applied on the to-be-included application file and the URL encoded file content is then merged with the data of the application file. When the merging format is base64 then base64 encoding is applied on the data of the to-be-included application file and the base 64 encoded file content is then merged with the data of the application file.

In one embodiment, the configuration file also includes a language mapper that provides an application language corresponding to the request language parameter and the user specific language. Some of the application files stored in runtime agent may be in multiple languages, for example, a catalog file for a particular application may be in English, German, or Chinese languages. The runtime agent stores the application language of the application file stored at the runtime agent. The application language may be different then the request language parameter included in the request or the user specific language included in a user profile. The language mapping is based on two parameters, a request language parameter that is included in the URL of the request received from the client, and a user specific language that is the language selected by the user at the client for accessing the application that sends the request. The language mapper is a language mapping code that determines the application language corresponding to the request language parameter and/or the user specific language. For example, a language mapper may include:

"request language parameter value":{
    "EN": {
        "request language parameter value ": "EN",
        "user specific language value": "en-US",
    },
    "DE": {
        " request language parameter value ": "DE",
        " user specific language value ": "de-DE",
    },
    "default":{
        " request language parameter value ": "EN", -continued " user specific language value": "en-US",
}

In this example, when the user specific language is "EN" (English) then it is mapped to an application file specific language "EN-US" (English-US).

The application package component may determine an access path for the different files and folders included in the application package (204). The access path may allow a client to access and retrieve data from any of the application files in the application folder. The access path of a file may also be used to merge data of one file with the data of another file. The access path for the different files in then stored in the application package (206).

Next the application package is deployed by the application package deploy component to a runtime agent (208). In one embodiment, deploying the application package includes transferring the application package to the runtime agent. Next the application package is then stored at the runtime agent (210). The runtime agent may include three storage areas: a shared storage area, a user specific storage area, and a configuration data storage area. The different application files and folders that have a scope as "shared" are stored in the shared storage area. The different application files and folders that have a scope as "system" and "config" are stored in the configuration data storage area of the runtime agent. The different personalization files related to a user, for example a particular theme or a selection of applications, may be stored in the user specific storage area.

The runtime agent includes a plurality of pre-defined placeholder files. In one embodiment, the data corresponding to the pre-defined placeholder files is dynamically determined by the application server and is not based on data stored at the application server. In one embodiment, the pre-defined placeholder files may not persist data and are used to retrieve and provide data during a process. For example, the pre-defined placeholder files may include a cache invalidate token, a user profile file, and a request property file. The cache invalidate token are defined for the different folders stored in the runtime agent. The "cache invalidate" file for a particular folder may include the last update time when the folder was created or when one or more of the application files in the folder or in any of the child folders related to the folder has been modified. In one embodiment, the cache invalidate token may use the current time at the application server when the changes with respect to any of the application file or folder were received, in YYYYMMDDHHMMSS where Y is the year, M is the month, D is the day, H is the hour, the second M is minute, and S is seconds, as the last update time. The cache invalidate token for a user specific folder may also include the user name appended with the last update time.

The user profile includes the user details of a user at the client system. The user profile may be retrieved from any system, for example a user's employee database, which stores the user related data. The user profile may provide user information, for example, user name, user role, for example manager, employee, etc., and user email address. In one embodiment, the request property includes the different parameters included in the request received from the client. The request property may include, for example, a language preference for receiving the result, at the client.

Next, access paths are received for the plurality of pre-defined placeholders included in the runtime agent (212).

When a request is received for the data corresponding to the pre-defined virtual files then the application server determines the data that may be retrieved by a process using the defined access path. For example, the access paths for the "cache invalidate" file may be:

/shared/global/_last_update.txt (for the root shared folder)
/shared/apps/com.company_name.app1/_last_update.txt
  (for a particular application)
/user/_last_update.txt (for a particular user).

The access path for the request property file may include, for example, a /request/* root folder to retrieve data from a request received at the runtime agent. The access path for user profile may include, for example, /user/env/roles.txt, /user/env/username.txt, /user/env/fullname.txt, and/user/env/email.txt.

In one embodiment, the defined access path of the placeholder file may be included in one of the access path of a file based on a user request. For example, the "cache invalidate" file access path may be included in the access path of a file that may have a "cache invalidate" property. The access path of the placeholder file may also be included in another file using an "include" statement. In this case the data corresponding to the placeholder file may be merged with the data of the application file.

Finally a user mapping link is received for mapping one or more files in the shared folder in the runtime agent to the user storage folder included in the runtime agent (214). In one embodiment, the user mapping link is provided to reduce processing time and improve availability of data when a request is received by the runtime agent. The user mapping link may map default application files that are to be provided to any new user to the user storage. The mapped files may be available whenever a new user is registered. This reduces the processing time to present the initial set of applications to a user at the client requesting applications data.

FIGS. 3A-3F is a flow diagram 300 illustrating a process to determine a response for a request received by a runtime agent, according to an embodiment. Initially a runtime agent receives a request from a client to retrieve data from the runtime agent (302). The request may be received by a resource handler Application Program Interface (API) of the runtime agent. The request may be received as a Hyper Text Transfer Protocol (HTTP) GET request. In one embodiment, the request may be received at an application executing at a client. A hosting system that hosts the application may then forward the request to the client. The request may include the access path of the file from which the data is to be retrieved. In one embodiment, the HTTP Get request may have the following format:
GET/<runtime agent alias>/<path within application package>/<file name>.<file extension>. For example:
GET rag/shared/apps/fin.ar.lineitems.display/1.3.5/Component-preload.js Next the runtime agent retrieves user profile of the user, at the client, from a hosting environment (304). The user may be the user that is logged in at the client and sends the request from the app at the client. The hosting environment may store user credentials, for example, user name, user E-Mail id, and role (manager, employee) assigned to user. In one embodiment, the runtime agent may include several user profile related placeholder files that receive the user profile retrieved by the runtime agent.

Next the runtime agent identifies files, stored in the runtime agent, based on the access path included in the received request (306). In one embodiment, the access path may be for a folder stored in the runtime agent. In this case, the files included in the folder are identified. The runtime agent then analyzes the configuration file, stored in the runtime agent, corresponding to the identified files (308). The configuration file may include configuration data related to the files. For example, the configuration data may include: scope, access property, and cache property of the files that are identified based on the access path included in the request received from the client system. The access property includes the different access, for example "read", "write", and "visible", and the corresponding different roles that are allowed the access.

Next, based on the analysis, the runtime agent compares a user role included in the retrieved user profile with the roles, included in the configuration file, corresponding to the identified files (310). The access properties, corresponding to the identified files, in the configuration file may be defined to provide accesses, for example one or more of read, write, or visible access, to the files for a particular role. These roles in the access property related to the identified files are compared with the user role. Based on the comparison the files that has a corresponding role matching with the user role are identified as user accessible files (312). For example, a user role for a user X may be "office assistant". The user X may send a request at the client system to retrieve data from a folder that includes files related to "manager" role. The runtime agent may then retrieve the role of the user X, logged in at the client, which sends the request to access data. The retrieved user X's role "office assistant" may then be compared with the roles corresponding to the folder that includes files related to "manager" role. The access right of the files included in the folder may have a write, read, or view access rights for different roles. For example, a portion of the configuration file shown below illustrates access rights for a catalog file included in the folder that includes files related to "manager" role.

```
"Shared/roles/manager/"{
    access : {
        write : {
            "catalog" : "../user/env/roles.txt",
                "anyOf" : ["Manager" ]
        }
        read : {
            "catalog" : "../user/env/roles.txt",
                "anyOf" : ["Manager", "Office Assistant"]
        }
        View : {
            "catalog" : "../user/env/roles.txt",
                "anyOf" : ["Manager", "Office Assistant"]
        }
    }
}
```

Based on comparing the access rights for the catalog file, defined in the configuration file, with the role "Office Assistant" for the user X, the user X may be provided a read and a view access right. As the write access statement does not have the role "Office Assistant" the user X may not be provided write access to the catalog file. The catalog file that may be read and view accessed by the user X may be identified as user accessible file.

Next the access path corresponding to the user accessible files are inserted in a result file (314). In one embodiment, the access path of the identified files are inserted into a result file using an "include" statement. For example, when the identified files includes an application file, a catalog file, and a groups files then the result file may include:

"applications": {{include " . . . / . . . /shared/roles/*/ apps_en.json" merge=none}}
"catalogs": {{include " . . . / . . . /shared/roles/*/catalogs_ en.json" merge="jsonmap"}}
"groups": {{include " . . . / . . . /shared/roles/*/groups_en. json" merge="jsonmap"}}

Next at (316) the runtime agent determines a user accessible file from the user accessible files that has a dynamic property based on the configuration file analyzed at 308. In one embodiment, a user accessible file has a dynamic property when a processing is to be performed to obtain data related to the file. Next in case a user accessible file from the user accessible files has a dynamic property the runtime agent parses the user accessible file having the dynamic property to identify an include statement in the user accessible file (318). In one embodiment, the include statement has an access path of a to-be-included file that is to be merged with the data of the user accessible file. The "include" statement may also include an access path of a placeholder file. In this case, the processing logic corresponding to the placeholder file is executed to retrieve the data corresponding to the placeholder file that is then merged with the data of the user accessible file.

Next the runtime agent determines whether the include statement in the user accessible file having a dynamic property has a language placeholder (320). In case the "include" statement has a language placeholder (condition in 320 is true) then the runtime agent retrieves a request language parameter from the request received at 302 (322). The runtime agent has a "request language" placeholder that has a corresponding processing logic to analyze the request header and retrieve a request language parameter included in the request header. The retrieved request language parameter may be provided in the request language placeholder.

Next at (324) the runtime agent determines an application language corresponding to at least one of the request language parameter and the user specific language based on a language mapper. The user specific language may be determined from the user profile retrieved at 304. The runtime agent may include some of the files in different languages. For example, an application catalog file may be in English, German, and French. The runtime agent stores an application language for these files, for example, an application file in English may have an application language "en-US" and an application file in German may have an application language "de-DE". The runtime agent determines the application language corresponding to the request language parameter and the user specific language based on the language mapper. In one embodiment, the runtime agent determines application language corresponding to the request language parameter. In case, the request does not include a request language parameter in the request then the application language corresponding to user specific language is determined. For example, the runtime agent may map a language "EN", either for the request language parameter or the user specific language, with an application language "en_US" based on a language mapper.

```
"EN": {
    "request lanuage": "EN",
    "user ": "en-US",
    "localeUnderscore": "en__US"
},
```

In one embodiment, the language mapper may be defined to map the un-mapped languages, of the request language parameter and the user specific language, to a default language. For example the language mapper may include a mapping for the English language, German language, Spanish language, and a default language. The default language mapping in the language mapper may be defined to map any language other than English, German or Spanish to "en_US", for example. In this case, when the request language parameter is Chinese language, for which the language mapper does not have a direct mapping, then the language mapper may map the Chinese language to "en_US" language.

Next an access path for an application language file is determined based on the determined application language (326). In one embodiment, the runtime agent replaces the include statement having the language parameter with the determined runtime agent language to obtain an access path for the application language file. For example, an access path template for a language file path may include:
varSiteURL="/user/flpsite_<include " . . . / . . . /request/ env/request language>"}}.json";

In this case when the application language is determined as "en_US" then the access path is determined as "/user/ flpsite_en_US.json", by replacing the _<include " . . . / . . . /request/env/request language> with the determined application language file. The determined access path for the application language file is inserted in a result file (330).

Next the runtime agent determines whether the include statement in the identified dynamic file has a cache invalidate token of a to-be-included file (330). In one embodiment, the cache invalidate token is used to invalidate cache for a particular file, for example a to-be-included file that has to be merged with the identified user accessible files, when the data included in the file or folder is changed but the changed data of the file has not been updated at the cache storage. The cache invalidate token includes a last update time which is the time when the data in the folder was last updated. A folder is considered updated when the data in the folder is added, changed, or deleted. When the data of the folder or file is changed then the cache invalidate token is regenerated by computing the time when the content in the folder is changed. The cache invalidate token may also be changed when a PUT request is received on the cache invalidation token to change the last update time with the time included in the PUT request. In one embodiment, the runtime agent determines whether a particular update request received for a file resulted in change of the file or folder and changes the last update time only when the file or folder has changed.

Next in case, the include statement has a cache invalidate token (condition in 330 is true) then the runtime agent retrieves the last update time included in the cache invalidate token of the to-be-included file (332). An access path of the to-be-included file is then determined including the last update time for the to-be-included file (334). The retrieved last update time replaces the include statement that has the cache invalidate token to obtain an access path of the to-be-included file including the last update time for the to-be-included file In one embodiment, a pre-defined access path template for the to-be-included file is provided that includes a placeholder for inserting the last modified time to the access path. Next the access path of the to-be-included file including the last update time is inserted in the result file (336). In case, the include statement does not include a language placeholder or a cache invalidation token (condition in 320 and 330 is false) then the access path of the to-be-included file is included in the result file (338).

Figure 3A:
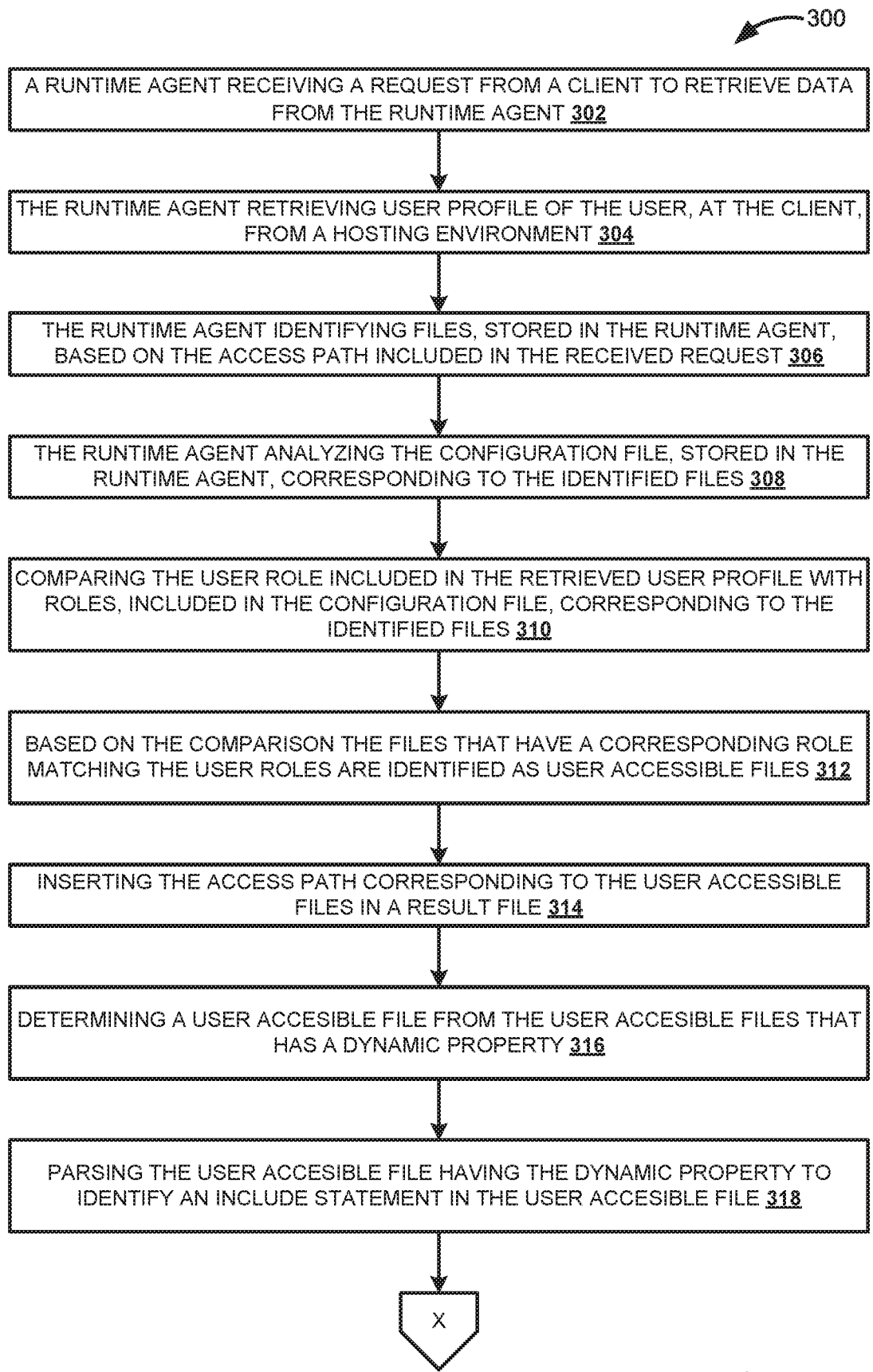
FIGS. 3A-3F is a flow diagram illustrating a process to determine a response for a request received by a runtime agent, according to an embodiment.
Figure 3B:
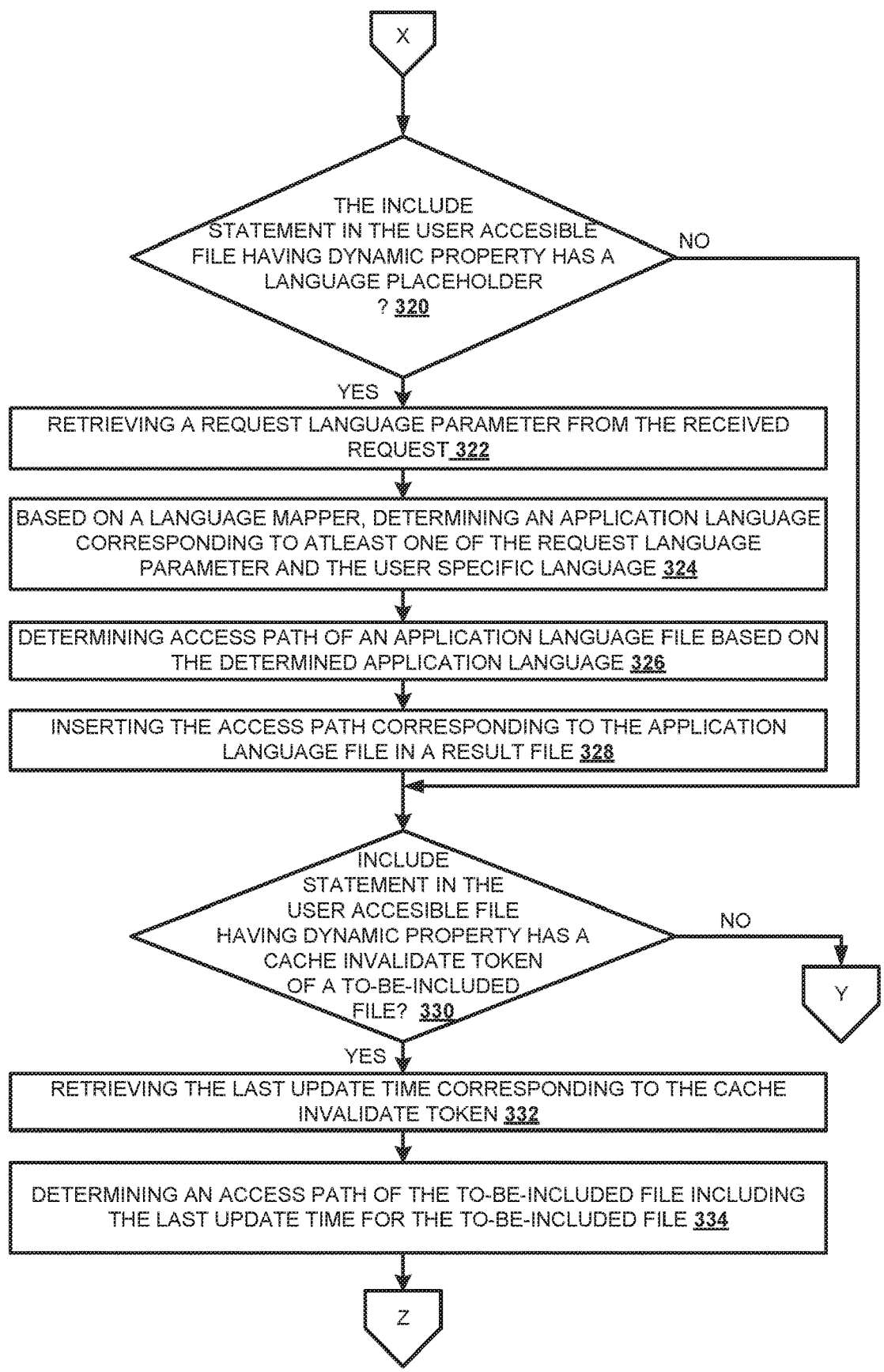
Figure 3C:
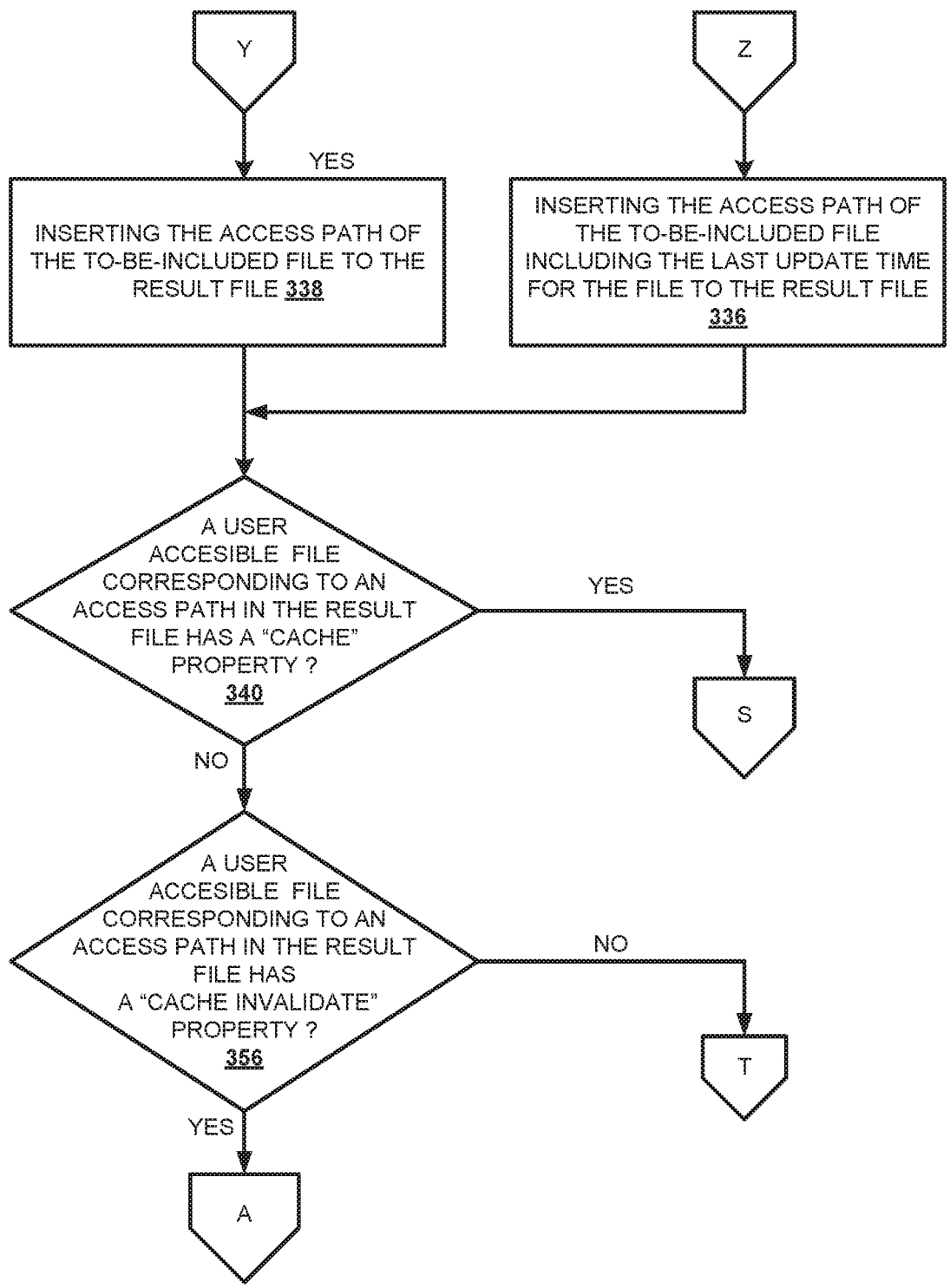
Figure 3D:
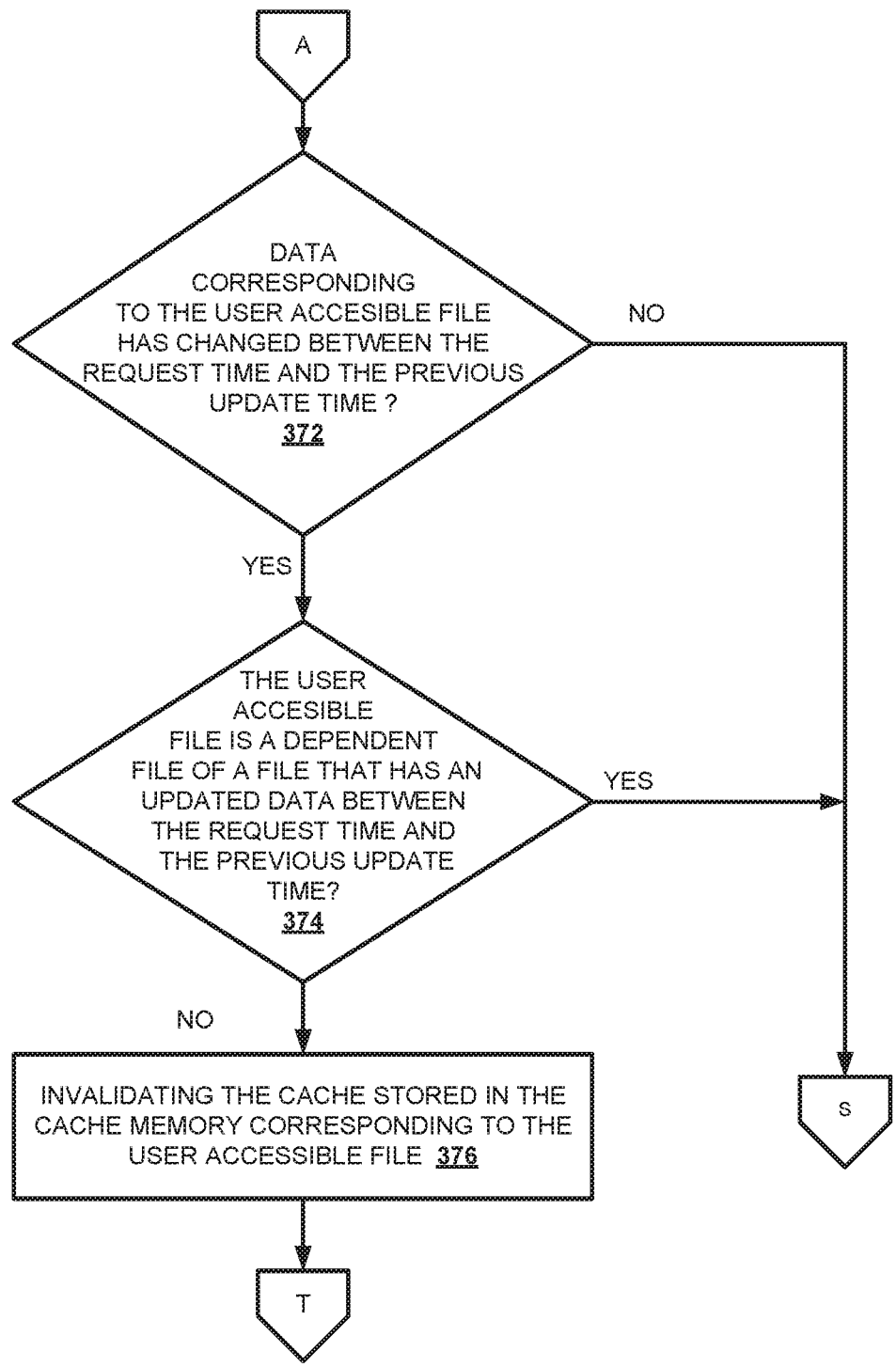
Figure 3E:
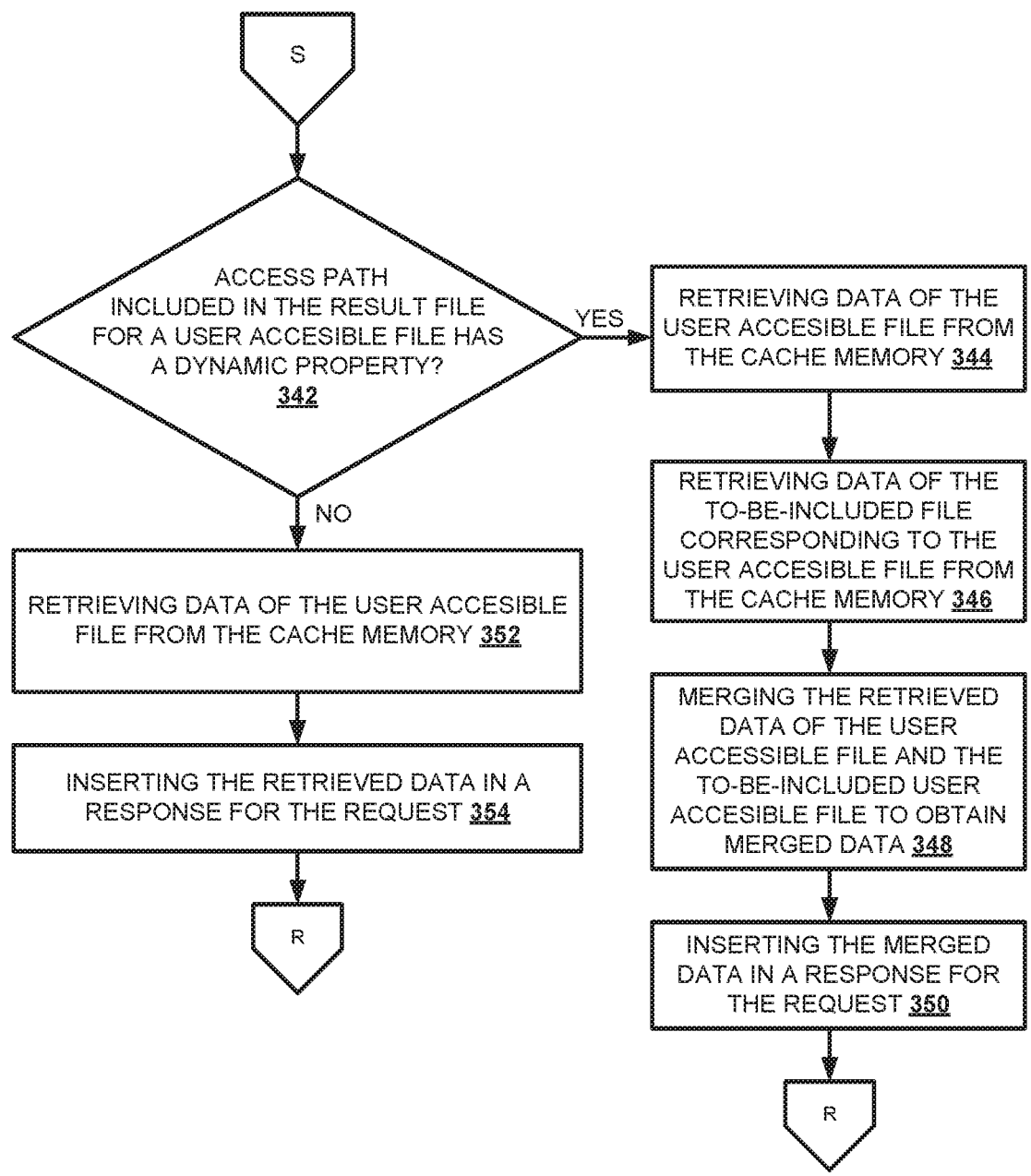

The data included in the files corresponding to the access paths in the result file are then retrieved to obtain the result. In one embodiment, a check is performed to determine whether a user accessible file corresponding to an access path in the result file has a "cache" property (340). In case the user accessible file has a dynamic property (condition in 340 is true) then the process disclosed in 342 to 354, shown in FIG. 3E, are executed by the runtime agent to retrieve data corresponding to the user accessible files that have access path included in the result file, from a cache memory. A cache memory stores the result obtained after processing a request. When the runtime agent receives a request with an access path for a particular file then it retrieves data for the file, either directly or after processing in case the file is a dynamic file. The runtime agent may then provide the retrieved data to the client that sent the request and also stores a copy of the response in a cache memory. During a subsequent request to retrieve data from the same file, the data stored in the cache memory may be used to send a response for the request. In case the request is a first request for a file that has a "cache" property then the data is retrieved from the user accessible file stored in the runtime agent.

In one embodiment, the access path of a file is modified to include a cache tag that redirects the runtime agent to a cache memory for retrieving the response for a request. For example a modified access path including a cache memory tag may be:
GET/rag/content/~<cache token>~/shared/apps/fin.ar.lineitems.display
/1.3.5/i18n/i18n_de_DE.properties To retrieve data from cache memory, a check may be performed to determine whether a user accessible file corresponding to an access path in the result file having a "cache" property (condition in 340 is true) has a dynamic property (342). In case the user accessible file corresponding to the access path included in the result file has a dynamic property (condition in 342 is true) then the data of the user accessible file is retrieved from the cache memory (344). The data corresponding to the user accessible file stored in cache memory may be retrieved. Next the data of the to-be-included file corresponding to the user accessible file may be retrieved from the cache memory (346). The dynamic file may include the access path of the to-be-included files. The data of the to-be-included file are to be merged with the data of the user accessible file. In this case, the previously computed data of the to-be-included file that is stored in the cache memory is retrieved. The to-be-included file may be an application file, including an application language file.

Next the data of the user accessible file retrieved at 344 and the data of the to-be-included file retrieved at 346 are merged to obtain merged data (348). In one embodiment, the data in the to-be-included file may be formatted based on a merge parameter that defines the encoding that is to be applied on the data in the to-be-included file. The encoded data of the to-be-included file is then merged with the data of the user accessible file. Next the merged data in the response is included in a response for the request received at 302 (350). The response may include the data corresponding to the user accessible files and to-be-included files associated with the user accessible files.

In case the access path included in the result file that has a cache property does not have dynamic property (condition in 342 in false) then the data corresponding to the user accessible file is retrieved from the cache memory (352). In this case the user accessible file is a static file that may not require a processing, for example a determination whether the user accessible file has an include file, to retrieve the data of the file. The retrieved data is then inserted in the response (354).

Figure 3F:
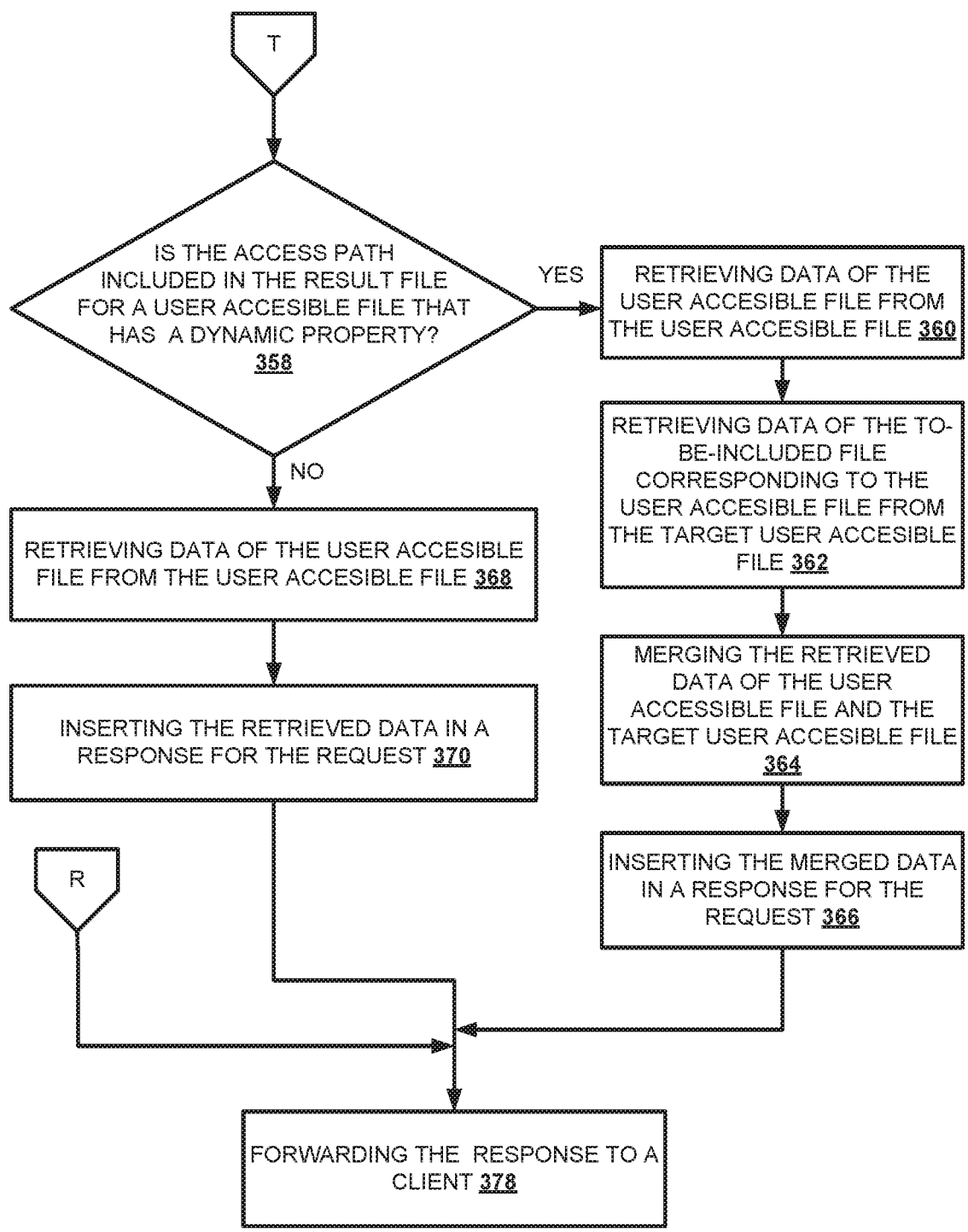

Next in case the user accessible file corresponding to an access path in the result processing file does not have a "cache" property (result in 340 is false) then a check is performed to determine whether the user accessible file has a "cache invalidate" property (356). In case the user accessible file corresponding to an access path in the result file does not have a "cache invalidate" property (condition in 356 is false) then the process disclosed in 358 to 370, shown in FIG. 3F, are executed by a runtime agent to retrieve data corresponding to the user accessible file that has an access path included in the result file, from the user accessible data.

To retrieve data from the user accessible file, a check may be performed to determine whether a user accessible file corresponding to an access path in the result file that does not have a "cache invalidate" property (condition in 356 is false) has a dynamic property (358). In case the user accessible file corresponding to the access path included in the result file has a dynamic property (condition in 358 is true) then the data of the user accessible file is retrieved from the user accessible file (360). Next the data of the to-be-included file corresponding to the user accessible file may be retrieved from the to-be-included user accessible file memory (362). The dynamic file may include the access path of the to-be-included files. The data of the to-be-included file are to be merged with the data of the user accessible file. In this case, the access path of the to-be-included file, in the user interface file is used to identify the to-be-included file. The data included in the identified to-be-included file is then retrieved.

In one embodiment, when the to-be-included file is an application language file then the access path, corresponding to the application language file, inserted in the result file at (328) is used to identify the application language file. The data included in the identified application language file may then be retrieved. In one embodiment, when the access path included in the result file a to-be-included file has a "cache invalidate" token then the cache invalidate token included in the access path of the user accessible file is removed. The access path of a to-be-included file stored in the runtime agent may be obtained after removing the cache invalidate token. For example, a navigation path, including a cache invalidate" token, in the result processing file may include:
/rag/content/20160312/sharedapps/catalog_de.json.

In this case the last update time "20160312" is the cache invalidate token that is removed to obtain the access path of the file for the German catalog file (catalog_de.json). The access path obtained after removing the cache invalidate token may be used to identify the to-be-included file. The data included in the to-be-included file is then retrieved.

Next the data of the user accessible file retrieved at 360 and the data of the to-be-included file retrieved at 362 are merged to obtain merged data (364). In one embodiment, the data in the to-be-included file may be formatted based on a merge parameter that defines the encoding that is to be applied on the data in the to-be-included file. The encoded data of the to-be-included file is then merged with the data of the user accessible file. Next the merged data in the response is included in a response for the request received at 302 (366). The response may include the data corresponding to the user accessible files and to-be-included files associated with the user accessible files.

In case the access path included in the result file that has a cache property does not have dynamic property (condition in 358 in false) then the data corresponding to the user accessible file is retrieved from the user accessible file (368). In this case the user accessible file is a static file that may not require a processing, for example a determination whether the user accessible file has an include file, to retrieve the data of the file. The retrieved data is then inserted in the response (370).

In case, the user accessible file corresponding to an access path in the result file has a cache invalidate property (condition in 356 is true) then a determination is made whether data included in the user accessible file has changed between the request time and the previous update time (372). In one embodiment, the cache invalidate token indicates to the runtime agent that the data for the user accessible file has to be accessed from the cache memory when the cache memory stores the last update data. As discussed, a user accessible file may be changed by a write operation of new data in a file, a modify operation to change data stored in a file, or deletion of data in a file. As the runtime agent stores files and folders in a hierarchical structure, a change in data in one of a child file may require a change in data of related files in the parent folder up to the root folder. A runtime agent stores a last update time for a file or folder whenever the data in the file has changed. After the change, the dependent data in the parent folder that are dependent on the modified data are changed. The runtime agent generates a new last update time after the dependent data in the parent folder has changed. As discussed, the cache memory stores a result, obtained after processing a file, based on a received request. In case the data in a file is changed and a request is not processed after the file data is changed, then the corresponding file data in the cache memory is not updated as it is based on file data prior to the change.

In one embodiment, when the data corresponding to the user accessible file has changed between the request time and the last update time (condition in 372 is true) the runtime agent determines whether the user accessible file is a dependent file of a file the data of which has changed between the request time and the previous update time (374). In one embodiment, when the user accessible file is a dependent file or when the data corresponding to the user accessible file has changed (condition in 374 is true) or when the data corresponding to the user accessible file has not changed between the request time and the previous update time (condition in 372 is false) then the data corresponding to the user accessible file is retrieved from the cache memory based on the process in 342 to 354 of FIG. 3E. The retrieved data is then inserted in the response of the request received at 302. When the data in a file is changed then the runtime agent determines the changed data in all the dependent files that have a data value dependent on the data that has changed. For example, an include statement to determine a data included in a user B may be:

url B=/user/catalog/<include . . . /A/ . . . >.json

In this case, when the data for file A is changed then the runtime agent determines the value for parameter B by inserting the value of A in the above include statement. Determining the updated data for a dependent file may require a lot of processing time and lead to a performance hit for the runtime agent. Therefore, the runtime agent provides the cached data for the file as a response to the request. Although the cached data in this case is not based on the latest data the runtime agent is able to provide the data without any disruption in data availability. The runtime agent may determine the data for the dependent files asynchronously. The order in which the dependent files are updated depends on ensuring that the service provided by runtime agent is not affected. For example, the runtime agent may first update a dependent file for which frequent requests are received compared to a dependent file that is not accessed regularly. The cache invalidate token may then be updated to include the time when the processed data for the dependent file is available.

In case the user accessible file is not a dependent file of a file that has changed between the request time and the previous update time (condition in 374 is false) then the runtime agent invalidates the cache stored corresponding to the user accessible file in the cache memory (376). In one embodiment, invalidating the cache may indicate to the runtime agent that the data for the user accessible file has to be retrieved directly from the user accessible file and not from the cache memory, as it may not store the latest data. In this case, the process described in 358 to 370 may be executed to retrieve data corresponding to the user accessible file from the user accessible file or the to-be-included user accessible file that is then inserted in the response for the request.

Finally the response, including data corresponding to the access paths of the user accessible files and the to-be-included files included in the result file, to the request received at 302 is forwarded to the client (378).

FIG. 4 is an exemplary block diagram illustrating a portion of result file 400 including access paths for a plurality of placeholder files, according to an embodiment. The result file includes an access path of the user name, request languages, and a uniform resource locator (URL) 402, which is an access path for an application language file, including an access path of a cache invalidate token 404 and an application request language parameter 406. The URL of the application rendering file may be determined based on replacing the access paths of the cache invalidate token 404 and the application request language parameter 406 with the values of the cache invalidate token and the application request language, respectively. In one embodiment, the processing logic corresponding to placeholder files are executed to obtain the data corresponding to the placeholder. For example, a "user profile" placeholder may have a corresponding placeholder to retrieve user name from the hosting environment.

FIG. 5 is an exemplary block diagram illustrating a result 500 obtained corresponding to the result file of FIG. 4, according to an embodiment. As shown the result file includes user name value "TESTUSER" and request language "EN". A URL of an application language file 502, corresponding to the application language file 402 in FIG. 4, is obtained by replacing the access path of the cache invalidate token 404 in FIG. 4 and the application language parameter 406 with the last update time "20160623" 504 and the application language parameter "EN_US" 506, respectively.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
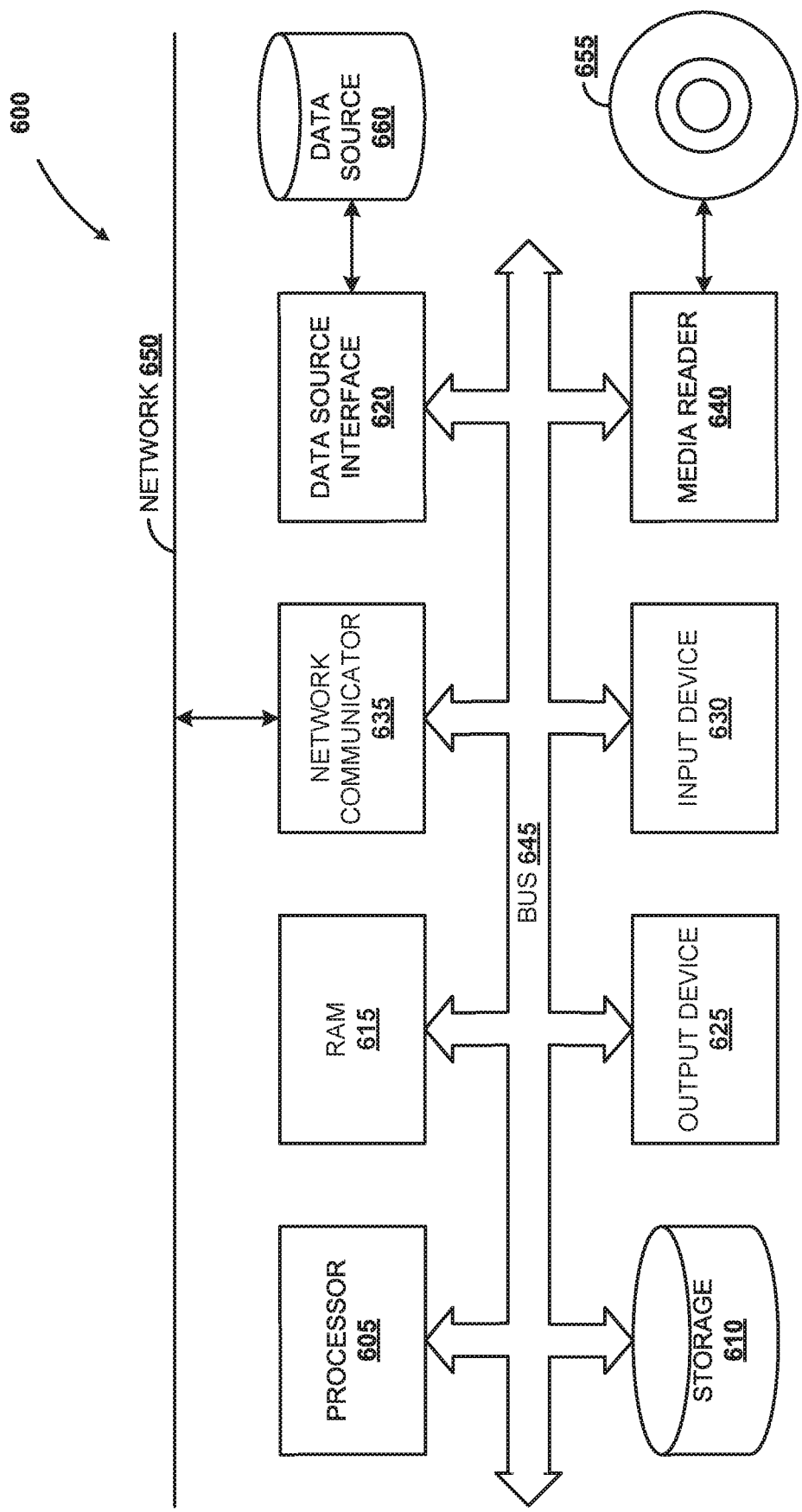
FIG. 6 is a block diagram illustrating an exemplary computer system, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
   receiving, at a runtime agent, a request, from a client, including an access path of a plurality of files utilized to obtain first data;
   based on the received request, determining one or more files from the plurality of files that have a dynamic property, wherein the dynamic property indicates that processing is to be performed to obtain additional data associated with the one or more files;
   parsing the one or more files that have the dynamic property to identify an include statement in the one or more files, wherein the include statement has an access path for a to-be-included file;

retrieving, by the runtime agent, the first data from the one or more files and the additional data from the to-be-included file;

retrieving, by the runtime agent, a user profile of a user, at the client, from a hosting environment, the user profile including a user role;

analyzing a configuration file, included in the runtime agent, storing a plurality of roles corresponding to the plurality of files;

comparing the roles corresponding to the plurality of files with the user role;

based on the comparing, identifying one or more files from the plurality of files that has a role from the plurality of roles matching with the user role as one or more user accessible files;

parsing the one or more user accessible files that have the dynamic property to identify a second include statement in the one or more user accessible files, wherein the second include statement has a second access path for a second to-be-included file;

retrieving, by the runtime agent, second data from the one or more user accessible files and third data from the second to-be-included file;

merging the first data retrieved from the one or more files, the additional data from the to-be-included file, the second data retrieved from the one or more user accessible files, and the third data retrieved from the second to-be-included file to obtain a merged data; and sending, by the runtime agent, a response including the merged data to the client.

2. The computer implemented method according to claim 1, further comprising:

retrieving a request language parameter from the received request and a user specific language from a user profile;

determining whether the include statement in the one or more files has a language placeholder;

when the include statement has the language placeholder, mapping an application language with at least one of the request language parameter and the user specific language;

determining an application language file based on the mapped application language; and retrieving fourth data from the application language file, wherein merging the first data, the additional data, the second data, and the third data to obtain the merged data further comprises:

merging the fourth data retrieved from the application language file.

3. The computer implemented method according to claim 1, further comprising:

determining, by the runtime agent, whether the include statement in the one or more files has a cache invalidate token corresponding to the to-be-included file; and when the include statement has the cache invalidate token:

retrieving a last update time of the to-be-included file; and determining an access path of the to-be-included file including the last update time.

4. The computer implemented method according to claim 1, further comprising:

determining whether a user accessible file from the one or more user accessible files has a cache invalidate property; and when the user accessible file has the cache invalidate property:

determining whether second data corresponding to the user accessible file has changed between a request time and a previous update time when third data included in the user accessible file is updated;

determining whether the user accessible file is a dependent file of a file that has an updated data between the request time and the previous update time; and retrieving the second data corresponding to the user accessible file from a cache memory when the second data corresponding to the user accessible file is unchanged between the request time and the previous update time and the user accessible file is the dependent file.

5. The computer implemented method according to claim 4, further comprising:

retrieving the second data corresponding to the user accessible file from the user accessible file when the second data corresponding to the user accessible file is changed between the request time and the previous update time and the user accessible file is independent of the file that has the updated third data between the request time and the previous update time.

6. The computer implemented method of claim 1, further comprising:

for other of the plurality of files, from the plurality of files, retrieving other data from the other of the plurality of files, wherein the response further includes the other data.

7. A computer system comprising:

at least one memory to store executable instructions; and at least one processor communicatively coupled to the at least one memory, the at least one processor configured to execute the executable instructions to:

receive a request, from a client, including an access path of a plurality of files utilized to obtain first data;

based on the received request, determine one or more files from the plurality of files that have a dynamic property, wherein the dynamic property indicates that processing is to be performed to obtain additional data associated with the one or more files;

parse the one or more files that have the dynamic property to identify an include statement in the one or more files, wherein the include statement has an access path for a to-be-included file;

retrieve the first data from the one or more files and the additional data from the to-be-included file;

retrieve a user profile of a user, at the client, from a hosting environment, the user profile including a user role;

analyze a configuration file, included at a runtime agent, storing a plurality of roles corresponding to the plurality of files;

compare the roles corresponding to the plurality of files with the user role;

based on the comparison, identify one or more files from the plurality of files that has a role from the plurality of roles matching with the user role as one or more user accessible files;

parse the one or more user accessible files that have the dynamic property to identify a second include statement in the one or more user accessible files, wherein the second include statement has an access path for a second to-be-included file;

retrieve second data from the one or more user accessible files and third data from the second to-be-included file;

merge the first data retrieved from the one or more files the additional data from the to-be-included file, the second data retrieved from the one or more user accessible files, and the third data retrieved from the second to-be-included file to obtain a merged data; and send a response including the merged data to the client.

8. The computer system according to claim 7, further comprising instructions to:

retrieve a request language parameter from the received request and a user specific language from a user profile;

determine whether the include statement in the one or more files has a language placeholder;

when the include statement has the language placeholder, map an application language with at least one of the request language parameter and the user specific language;

determine an application language file based on the mapped application language; and retrieve fourth data from the application language file, wherein merge the first data, the additional data, the second data, and the third data to obtain the merged data further comprises:

merge the fourth data retrieved from the application language file.

9. The computer system according to claim 7, further comprising instructions to:

determine whether the include statement in the one or more files has a cache invalidate token corresponding to the to-be-included file; and when the include statement has the cache invalidate token:

retrieve a last update time of the to-be-included file; and determine an access path of the to-be-included file including the last update time.

10. The computer system according to claim 7, further comprising instructions to:

determine whether a user accessible file from the one or more user accessible files has a cache invalidate property; and when the user accessible file has the cache invalidate property:

determine whether second data corresponding to the user accessible file has changed between a request time and a previous update time when third data included in the user accessible file is updated;

determine whether the user accessible file is a dependent file of a file that has an updated data between the request time and the previous update time; and retrieve the second data corresponding to the user accessible file from a cache memory when the second data corresponding to the user accessible file is unchanged between the request time and the previous update time and the user accessible file is the dependent file.

11. A non-transitory computer-readable medium to store instructions, which when executed by a computer, causes the computer to:

receive a request, from a client, including an access path of a plurality of files utilized to obtain first data;

based on the received request, determine one or more files from the plurality of files that have a dynamic property, wherein the dynamic property indicates that processing is to be performed to obtain additional data associated with the one or more files;

parse the one or more files that have the dynamic property to identify an include statement in the one or more files, wherein the include statement has an access path for a to-be-included file;

retrieve the first data from the one or more files and the additional data from the to-be-included file;

retrieve a user profile of a user, at the client, from a hosting environment, the user profile including a user role;

analyze a configuration file, included at a runtime agent, storing a plurality of roles corresponding to the plurality of files;

compare the roles corresponding to the plurality of files with the user role;

based on the comparison, identify one or more files from the plurality of files that has a role from the plurality of roles matching with the user role as one or more user accessible files;

determine whether a user accessible file from the one or more user accessible files has a cache invalidate property;

when the user accessible file has the cache invalidate property:

determine whether second data corresponding to the user accessible file has changed between a request time and a previous update time when third data included in the user accessible file is updated;

determine whether the user accessible file is a dependent file of a file that has an updated data between the request time and the previous update time; and retrieve the second data corresponding to the user accessible file from a cache memory when the second data corresponding to the user accessible file is unchanged between the request time and the previous update time and the user accessible file is the dependent file;

merge the data retrieved from the one or more files and the to-be-included file to obtain a merged data; and send a response including the merged data to the client.

12. The non-transitory computer-readable medium according to claim 11 to store instructions, which when executed by a computer, causes the computer to:

retrieve a request language parameter from the received request and a user specific language from a user profile;

determine whether the include statement in the one or more files has a language placeholder;

when the include statement has the language placeholder, map an application language with at least one of the request language parameter and the user specific language;

determine an application language file based on the mapped application language; and retrieve second data from the application language file, wherein merge the first data and the additional data to obtain the merged data further comprises:

merge the second data retrieved from the application language file.

13. The non-transitory computer-readable medium according to claim 11 to store instructions, which when executed by a computer, causes the computer to:

determine whether the include statement in the one or more files has a cache invalidate token corresponding to the to-be-included file; and when the include statement has the cache invalidate token:

retrieve a last update time of the to-be-included file; and determine an access path of the to-be-included file including the last update time.

14. The non-transitory computer-readable medium according to claim 11 to store instructions, which when executed by a computer, causes the computer to:
parse the one or more user accessible files that have the dynamic property to identify a second include statement in the one or more user accessible files, wherein the second include statement has an access path for a second to-be-included file; and
retrieve second data from the one or more user accessible files and third data from the second to-be-included file, wherein merge the first data and the additional data to obtain the merged data further comprises:
merge the second data retrieved from the one or more user accessible files and the third data retrieved from the second to-be-included file.

* * * * *